US006644026B2

(12) United States Patent
Shimshi

(10) Patent No.: US 6,644,026 B2
(45) Date of Patent: Nov. 11, 2003

(54) BUOYANT-ORBICULAR-SEESAW-SYSTEM (BOSS)

(76) Inventor: Ezra Shimshi, P.O. Box 421011, Atlanta, GA (US) 30342

( * ) Notice: Subject to any disclaimer, the term of this patent is extended or adjusted under 35 U.S.C. 154(b) by 0 days.

(21) Appl. No.: 10/123,294

(22) Filed: Apr. 15, 2002

(65) Prior Publication Data

US 2003/0192310 A1 Oct. 16, 2003

(51) Int. Cl.[7] .......................... F01K 7/00; F03G 7/06; F03G 7/02

(52) U.S. Cl. .......................... 60/495; 60/675

(58) Field of Search .......................... 60/495, 496, 497, 60/500, 505, 675

(56) References Cited

U.S. PATENT DOCUMENTS 2,513,692 A * 7/1950 Tubbs .......................... 60/496
3,360,926 A * 1/1968 Parr .......................... 60/496
4,121,420 A * 10/1978 Schur .......................... 60/675

FOREIGN PATENT DOCUMENTS

GB 2128258 A * 4/1984 .......................... F03G/7/06

* cited by examiner

*Primary Examiner*—Sheldon J. Richter

(57) ABSTRACT

There is provided, an embodiment, a machine and a method for utilizing the roll of on imbalanced seesaw-like system to obtain useable power. A buoy 11 filled with air is immersed in water inside a container 13, at each end of rolling seesaw. One buoy 11 displaces water outwards, by the force of its buoyancy, in one container 13, while another buoy 11 displaces water inward, by derivative force acting on it in an outwards direction, in the other container 13. The buoys 11 are connected by a pipe 10, which moves the buoys, back and forth, in the containers 13. During the roll, one container 13 becomes heavier than the other and always on the same side of the rolling path, which keeps the seesaw rolling in one direction.

6 Claims, 3 Drawing Sheets

BUOYANT-ORBICULAR-SEESAW-SYSTEM (BOSS)

BACKGROUND OF THE INVENTION a) Field of the Invention

The present invention relates to systems and methods for covering cmbient energy into useable source of power.

b) The Prior Art

A limited range of systems and methods are known for converting ambient energy into useable source of power. The prior art has failed to provide the unique combination of concepts presented in the present invention.

SUMMARY OF THE INVENTION

The invention provides, in the present embodiment, a system and method for converting ambient energy into useable source of power. The invention, titled Buoyant-Orbicular-Seesaw-System, in short, BOSS, can drive a generator. The BOSS is c seesaw-like arm connected to a container at each of its ends. A buoy, filled with fluid, inside each container is immersed in heavier fluid. The buoys, connected by a pipe, can force their lighter fluid to flow between them, as they move in orbicular paths. A starting rolling speed, of the arm. may be required when the arm is not long enough. As the containers reach certain rolling speed, the buoyancy influence changes the direction of the buoyant effects on the buoys from up to inward, which is the center of the rolling arm. One of the means for pushing the pipe downwards with the buoys is a pair of weights near the center of the pipe. Every time the arm crosses its horizontal line, the pair of weights moves the buoys downward and the heavier container falls down to the bottom of the vertical line. As the containers cross the vertical line, the upper container becomes heavier than the lower container and it continues to fall down in the some direction. Though the speed of the containers is high, the center of the arm, where the pair of weights are located, is conveniently slow enough for buoyant bodies to move at their pace.

The BOSS can work in combination with other similar machines and it can roll under the effect of other unidirectional forces.

DESCRIPTION OF SPECIFIC EMBODIMENT

Figure 1:
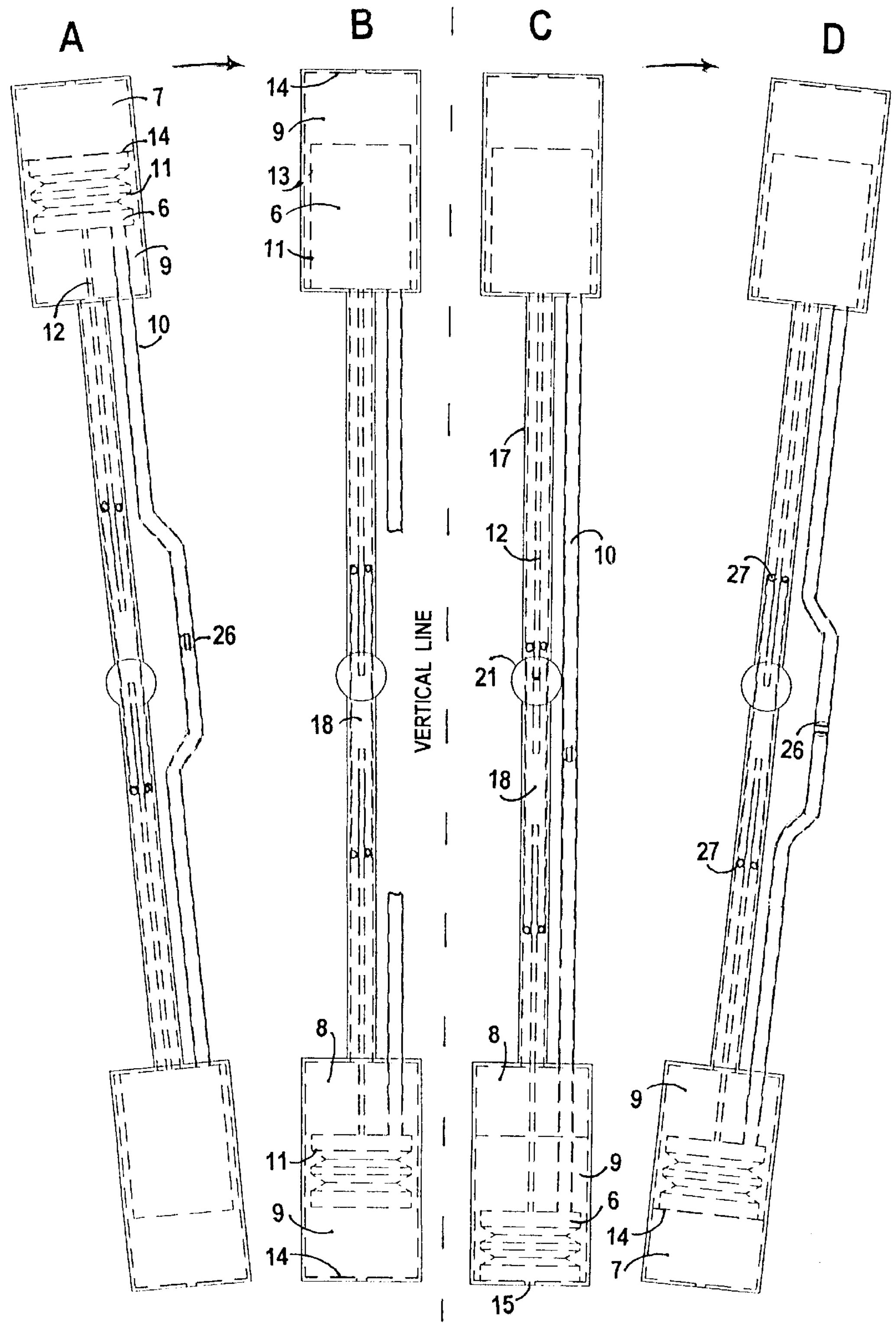
FIG. 1 is four-stage process A, B, C, and D, illustrating a pair of containers in positions just before, during, and right after they cross their vertical line.

FIG. 1 illustrates the four-stage process just before. during, and right after a pair of buoys and their respective shaft cross the vertical line, roll and re-cross the vertical line. At predetermined radial degrees before crossing their vertical line, valve 26 turns on, shown in FIG. 1A, allowing gas from the bottom buoy 11 to flow through pipe 10 and into the upper buoy 11. FIG. 1B shows the upper buoy 11, which is under the pressure of centrifugal force less the G pull of gravity, having been inflated with gas from the bottom buoy 11, which is under tan pressure of centrifugal force plus the G pull of gravity and the weight of shaft 12 and its weighty slider 18. As the upper buoy 11 inflates, its increased buoyancy force together with shaft 12, cause liquid 9 in the upper container 13 to be displaced upward. The elevation of liquid 9 into the top section of the upper container 13 pushes membrane 14 up to the outward wall of container 13, with air 7 escaping through the respective vent in the two-way air vent 15. At the same time the deflating buoy 11 in the bottom container 13 had evacuated the top section of the bottom container 13, which is represented by vacuum 8. Since the bottom deflated buoy 11 is at its lowest buoyancy influence, weighty slider 18 with the lower section of shaft 12 alore, can sink it to the bottom of container 13, as they extend downward, shown in FIG. 1C. At this stage, net torque has already been materialized when the last stage is yet to occur, which involves the input of ambient energy from the atmospheric pressure. This ambient energy input occurs as soon as the bottom surface of the deflated buoy 11 and the upper surface of the bottom membrane 14 make contact and the sucking force between vacuum 8 and the atmospheric pressure allows air 7 to pass through the respective vent of the two-way air vent 15. The bottom compartment, which is enclosed by membrane 14 and the outward wall of the bottom container 13, can then be filled with air 7. Membrane 14, with air 7 beneath it and with the buoyant force of the deflated buoy 11, can elevate liquid 9, which fills the top space in the bottom container 13 evacuated by the receding buoy 11, as it is seen in FIG. 1D. The pair of stoppers 27, which are embedded in each weighty slider 18 can, then, lock the three sections of shaft 12 from extending until next 1C position. When the respective containers 13 cross the vertical line at predetermined number of degrees thereafter, valve 26 turns off, shown in FIG. 1D, preventing any flow of gas 6 between the respective buoys 11.

Figure 2:
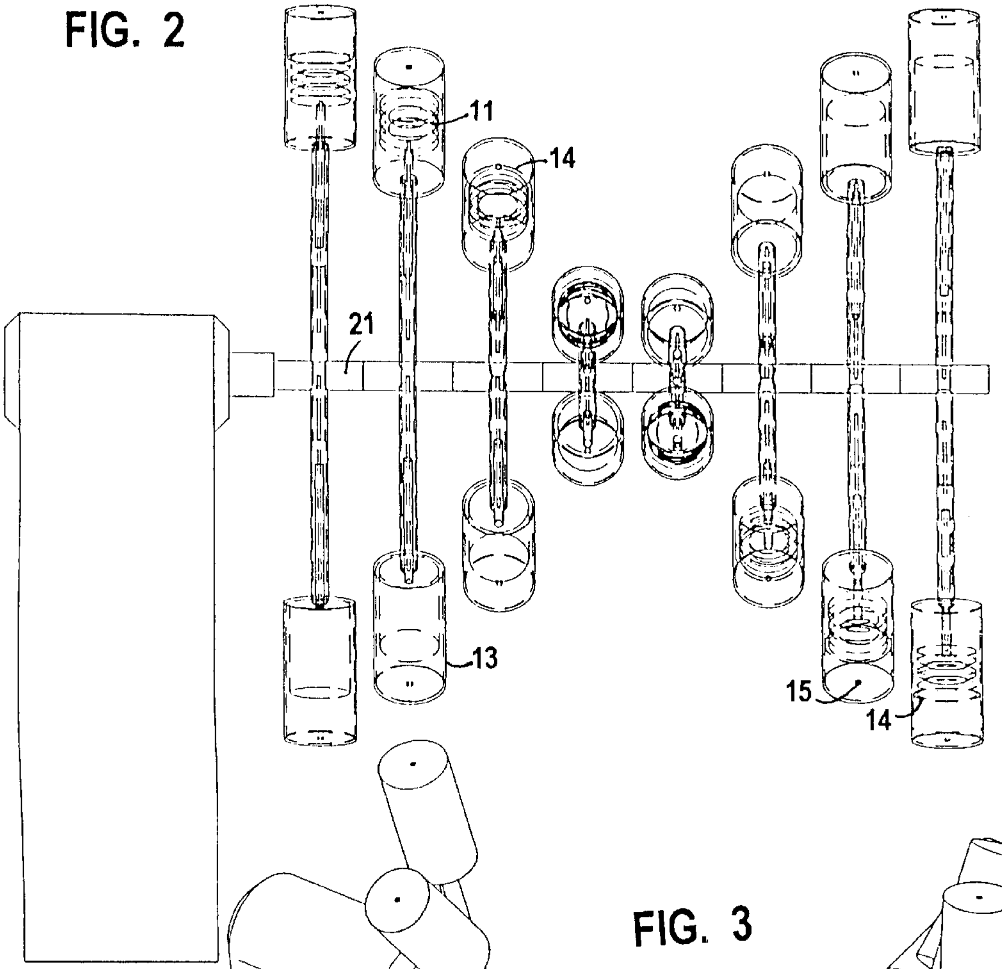
FIG. 2 is the side view of the BOSS, arranged in tandem on a single axle, in which the vertical line separates the high and low orbits of the units of liquid.
Figure 3:
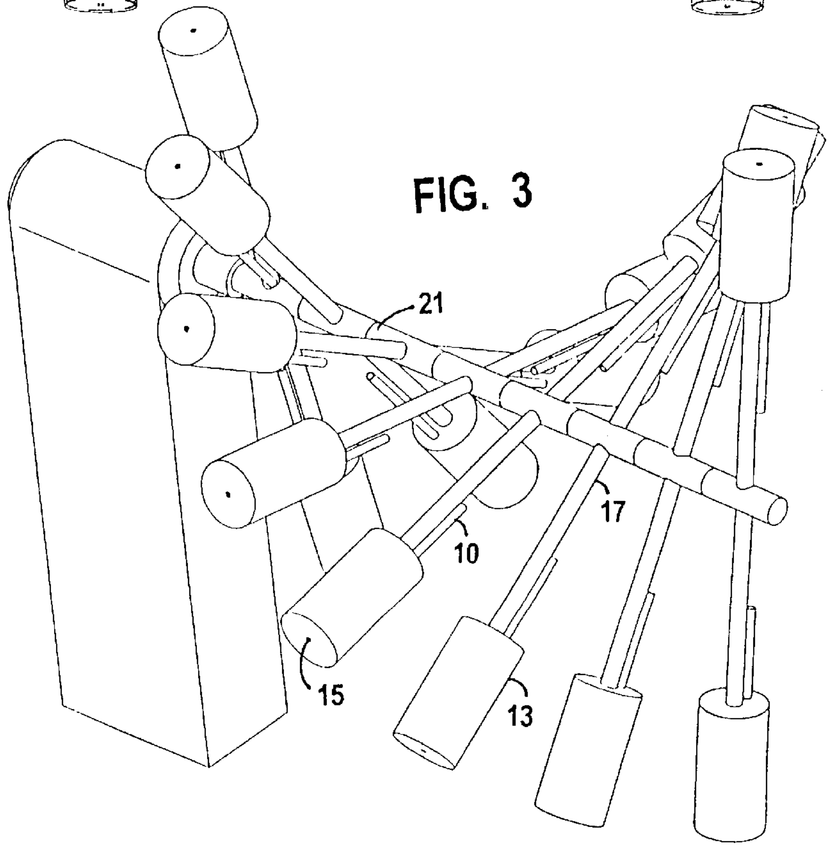
FIG. 3 is the view of the rotating BOSS showing random position of the seesaw frames.
Figure 4:
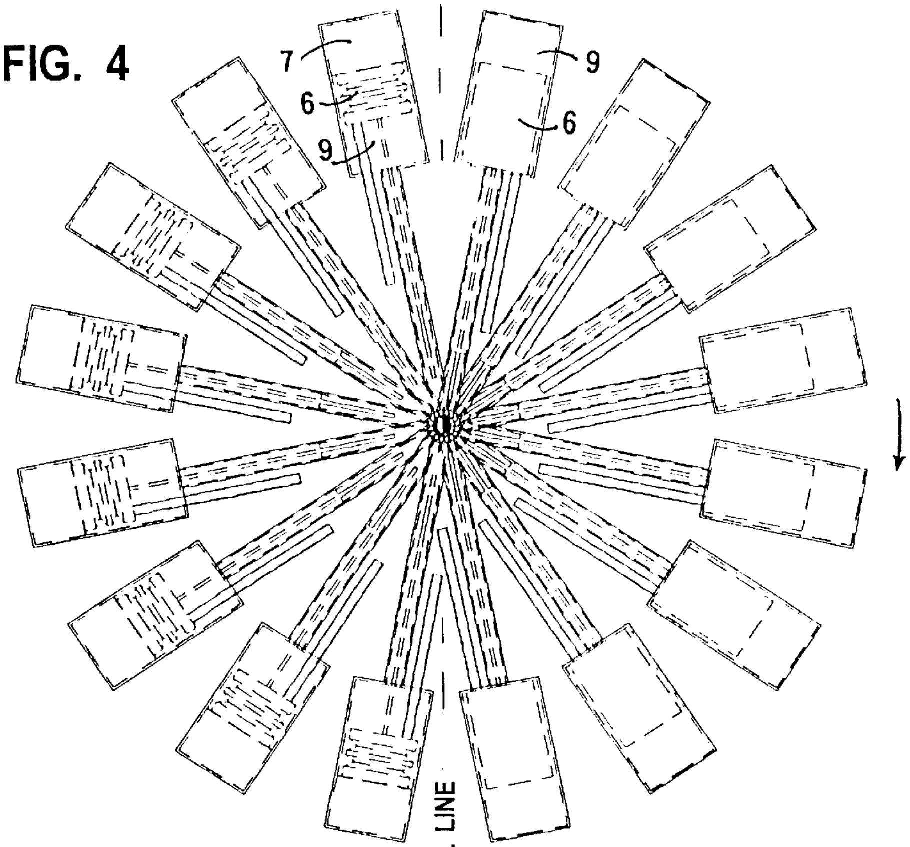
FIG. 4 is the perspective view of the BOSS, in which the combined seesaw frames appear as radial arrangement, depicting the two radial strings of units of liquid, opposite each other, at two distinct orbits and illustrating the distinct two prong gravity pulls affecting downward-directed movements, one on the fast falling units of liquid at the high orbit, the other on each of the slow failing individual shafts and revealing the effect by the atmospheric pressure on the velocity of the system.
Figure 5:
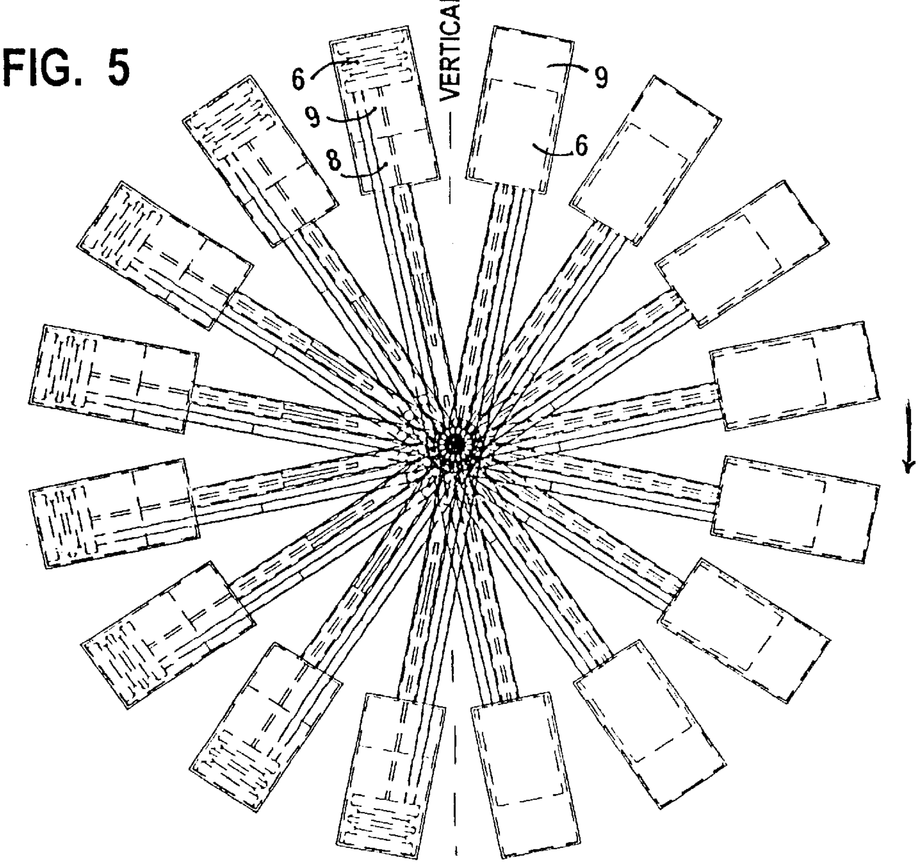
FIG. 5 is the some view as in FIG. 4, showing the individual seesaw frame, shown also in FIG. 1C, where the net torque has not yet reached its highest potential, as when the ambient energy from the atmospheric pressure have been deployed, shown in FIG. 1D.

The combined physical concepts of orbicular motions, buoyant influences, two prong gravity pulls and the input of ambient energy by the atmospheric pressure, are the basic elements on which the BOSS can operate. FIG. 2 shows seesaw frames mounted along single axle 21, in tandem, where the vertical line divides the high and the low orbits of the units of liquid. FIG. 3 is random view of the rotating Boss. When the BOSS rotates, each pair of buoys 11 are allowed to move in orbicular path by buoyant influences from one end of their vertical line to the other end, where they chance their orbit. Each upper container 13 can develop net torque, as shown in FIG 4 and in FIG. 5, as soon as it crosses its vertical line. A pair of containers 13 is fixed to each seesaw frame 17 and each container 13 is at the same distance from axle 21. Pipe 10 can curve-flex with the movements of the pair of buoys 11 it connects. Valve 26 can be embedded within each pipe 10 to control the flow of gas between the respective buoys 11. Buoy 11 in each container 13 can hove aerodynamic shape and other means to help it to propel effectively through liquid 9. As it is seen in FIG. 4, the combined seesaw frames appear as redial arrangement. The radial strings of the elevated units of liquid 9 appear at two distinct orbits, opposite to each other. The fast falling units of liquid 9 at the high orbit makes it clear to what direction the BOSS is being pushed, provided, each shaft 12 weighs less than the respective liquid 9 displaced, and provided, the BOSS is rotating above the required minimum speed. In both, FIG. 4 and FIG. 5, net torque has been achieved, even though in FIG. 5 the ambient energy input by the atmospheric pressure has not, yet, been deployed. The input of the ambient energy by the atmospheric pressure, shown in FIG. 4, displaces the liquid 9 in each bottom container 13 further inward toward the axis of rotation, which can only increase the radial velocity of the system. The kinetic energy of the radial and the fast falling units of liquid 9 at the high orbit is used only in part to lift liquid 9 to that high orbit, whereas, the kinetic energy of the vertical and slow failing of the individual shafts 12, one after the other, with their weighty sliders 18, are used entirely to elevate liquid 9 onto both the low orbit and the high orbit. The ambient energy input by the atmospheric pressure, shown in FIG. 4, is used only and entirely to elevate the liquid 9 onto the low orbit. The two prong gravity pulls that are affecting the downward-directed movements, one on the radial and fast falling units of liquid at the high orbit, and the other on the vertical and slow falling individual shafts, are the distinct features that make the present invention novel; whereupon, the introduction of the combined physical concepts described above make the present embodiment unique in its usefulness.

While this invention has been description with reference to the mechanism disclosed herein, it is not confined to the details as set forth and is not intended in any way to limit the broac features or principles of said apparatus, method, system, the machine, or the scope of patent monopoly to be granted. This application is intended to cover any modification or changes that may come within the scope of the following claims.

I claim:

1. Apparatus, for combining orbicular motions, buoyant influences, falling mass and atmospheric pressure to effect the elevation of units of liquid onto two distinct orbits that have radial downward push at the direction of rotation, comprising:

(a) Seesaw frames;

(b) Containers, which contain liquid, one container fixed to each end of a seesaw frame;

(c) Buoys, which contain gas, each buoy immersed in liquid in each container;

(d) Pipes, each pipe adopted to allow the gas to flow between the respective pair of buoys at predetermined section on their orbicular path;

(e) Means for synchronizing the elevation of liquid with the position of each buoy on its orbicular path.

2. The apparatus as in claim 1, wherein the means for synchronizing the elevation of liquid with the position of each buoy on its orbicular path, comprising:

(a) Valves, each embedded within one pipe and adapted to be “on” only when its respective seesaw frame is at the vicinity of its vertical line;

(b) Shafts, each shaft with a buoy at its each end and is adopted to extend and move with either of the buoys downwards;

(c) Axle, on which the seesaw frames can be mounted;

(d) Means for allowing and for preventing the inflation and deflation of the buoys;

(e) Means for enabling each shaft to extend its length.

3. The apparatus as in claim 2, wherein the means for allowing and for preventing the inflation and deflation of the buoys, comprising:

(a) Membrane, in each container adapted to form close compartment with the outward wall of the container;

(b) Two-ways air vent, in the outward wall of each container adopted to allow air to pass to and from the closed compartment;

(c) Weighty sliders, one at the mid section of each shaft, adapted to affect the downward movement of each respective buoy;

(d) Means for preventing and allowing the extension of each shaft.

4. A method, for developing radial chains of units of liquid at two distinct orbits opposite to each other and on predetermined sections of the orbicular path by up and down pull and push of mass, including the steps;

(a) Rotating seesaw frames, which are mounted on a single axle in tandem, at predetermined speed;

(b) Aligning each seesaw frame along vertical line one after the other, each seesaw frame holding a container at each of its ends, each container can have close compartment between its outward wall and a membrane, each container contains liquid, in which a buoy containing gas is immersed, a shaft can move each buoy downward, gas can flow from one buoy up to the other buoy through a curve-flex pipe with a valve, which can shut off the flow of the gas;

(c) Allowing the gas to flow from the bottom buoy to the upper buoy and air to exit from the top close compartment so as to enable the upper buoy to inflate and the liquid to occupy the top section of the upper container;

(d) Utilizing the potential sucking force of the evacuated space, caused by the deflating buoy in the bottom container, to elevate the liquid from the mid section of the bottom container to the top section by sinking the deflated buoy to the bottom of the container so that it can make contact with the respective membrane, whereby ambient energy input from atmospheric pressure is realized.

5. A system, for utilizing distinct two-prong gravity pulls that are affecting the downward-directed movements of mass, one on falling liquid mass, the other on falling solid mass, so as to push seesaw system in its rotating direction, comprising:

(a) Containers, containing liquid, each container fixed to each end of a seesaw frame;

(b) Buoys, one buoy immersed in liquid in each container;

(c) Shaft, adapted to move the pair of buoys;

(d) Means for synchronizing the movements of the buoys with the position of the system.

6. The system, as in claim 5, wherein said means for synchronizing the movements of the buoys with the position of the system, comprising:

(a) Axle, on which of seesaw frames can be mounted in tandem;

(b) Means for increasing and decreasing the buoyancy force of each buoy;

(c) Means for allowing the elevation of liquid in each pair of containers at predetermined section on the orbicular path;

(d) Means for locking in position the elevated liquid in each pair of containers at predetermined section on the orbicular path.

* * * * *